United States Patent [19]

Sack

[11] 4,298,388

[45] Nov. 3, 1981

[54] ALKALI-FREE SEALING GLASSES FOR MOLYBDENUM

[75] Inventor: Werner Sack, Mainz, Fed. Rep. of Germany

[73] Assignee: Jenaer Glaswerk Schott & Gen., Mainz, Fed. Rep. of Germany

[21] Appl. No.: 194,979

[22] Filed: Oct. 8, 1980

[30] Foreign Application Priority Data

Oct. 11, 1979 [DE] Fed. Rep. of Germany ....... 2941215

[51] Int. Cl.³ .............................................. C03C 3/04
[52] U.S. Cl. ...................................... 501/15; 501/21; 501/64; 501/70
[58] Field of Search .......................................... 106/52

[56] References Cited

U.S. PATENT DOCUMENTS

| | | | |
|---|---|---|---|
| 3,496,401 | 2/1970 | Dumbaugh ........................... | 106/52 |
| 3,978,362 | 8/1976 | Dumbaugh et al. .................. | 106/52 |
| 4,105,826 | 8/1978 | Thomas ................................. | 106/52 |
| 4,238,705 | 12/1980 | Thomas ................................. | 106/52 |

FOREIGN PATENT DOCUMENTS 2733269  2/1978  Fed. Rep. of Germany ........ 106/52

Primary Examiner—O. R. Vertiz
Assistant Examiner—Mark Bell
Attorney, Agent, or Firm—Haight, Rosfeld & Noble

[57] ABSTRACT

$SiO_2$-$Al_2O_3$-alkaline earth oxides glass compositions suitable for glass/molybdenum sealings with high thermal load capability, having coefficients of thermal expansion in the temperature range of 20°–300° C. of 4.6–5.1×10⁻⁶/° C., glass transformation temperatures (Tg) of 775°–810° C., softening temperatures (Ew) greater than 930° C., processing temperatures ($V_A$) of 1232°–1273° C. and at length of $V_A$-Ew greater than 300° C. as regards processing technology of these glasses in the mixture, which consist essentially of the following components, computed as percent by oxide weight:

| | |
|---|---|
| $SiO_2$ | 57.00–64.00 wt % |
| $Al_2O_3$ | 12.50–16.50 wt % |
| $ZrO_2$ | 1.00–5.50 wt % |
| $Al_2O_3$ + $ZrO_2$ | 15.00–19.00 wt % |
| CaO | 11.50–19.20 wt % |
| BaO | 0–6.50 wt % |
| $CeO_2$ | 0–8.00 wt % |
| $TiO_2$ | 0–4.50 wt % |
| CaO + BaO + $CeO_2$ + $TiO_2$ | 18.60–25.70 wt % and |
| $As_2O_3$ | 0–0.30 wt % |

3 Claims, No Drawings

ALKALI-FREE SEALING GLASSES FOR MOLYBDENUM

DESCRIPTION OF THE INVENTION

1. Technical Field of the Invention

This invention relates to alkali-free, silicate sealing glasses having thermal expansion coefficients # of $4.6-5.1 \times 10^{-6}/°C$. and transformation temperatures (Tg) of 775°–810° C., which are accordingly suitable for sealing with molybdenum and therefore useful, e.g., for the manufacture of so-called halide lamps and/or halide-containing filament lamps with regenerating cycles which have a high thermal load capability.

2. Background Art $SiO_2$-$Al_2O_3$-alkaline earth oxide glass compositions have been described in DOS No. 27 33 169 for seals with molybdenum; these familiar glasses are, however, poorly suited for machine tube or pipe manufacturing.

DISCLOSURE OF THE INVENTION

Accordingly, it is a general object of the present invention to provide a glass composition useful for machine tube manufacturing.

Another object of the present invention is to provide glass compositions having a low devitrification tendency.

A further object of the present invention is to provide glass compositions suitable for sealing with molybdenum to form a seal having excellent mechanical strength during continuous or successive use.

An additional object of the present invention is to provide glass compositions which are colorless or yellow and useful in halide or halide-containing filament lamps.

A more particular object of the present invention is to provide yellow halide lamps which do not require the use of any additional filter glasses.

Upon study of the specification and appended claims, further objects, features and advantages of the present invention will become more fully apparent to those skilled in the art to which this invention pertains.

Best Mode for Carrying Out the Invention

Briefly, the above and other objects, features and advantages of the present invention are attained in one aspect thereof by providing $SiO_2$-$Al_2O_3$-alkaline earth oxides glass compositions suitable for glass/molybdenum sealings with high thermal load capability, having coefficients of thermal expansion in the temperature range of 20°–300° C. of $4.6-5.1 \times 10^{-6}/°C$., glass transformation temperatures (Tg) of 775°–810° C., softening temperatures (Ew) greater than 930° C., processing temperatures ($V_A$) of 1232°–1273° C. and a length of $V_A$-Ew greater than 300° C. as regards processing technology of these glasses, which consist essentially of the following components, computed as percent by weight oxide:

| | |
|---|---|
| $SiO_2$ | 57.00–64.00 wt % |
| $Al_2O_3$ | 12.50–16.50 wt % |
| $ZrO_2$ | 1.00– 5.50 wt % |
| $Al_2O_3 + ZrO_2$ | 15.00–19.00 wt % |
| CaO | 11.50–19.20 wt % |
| BaO | 0– 6.50 wt % |
| $CeO_2$ | 0– 8.00 wt % |
| $TiO_2$ | 0– 4.50 wt % |
| $CaO + BaO + CeO_2 + TiO_2$ | 18.60–25.70 wt % and |
| $As_2O_3$ | 0– 0.30 wt % |

As additional characteristic features, these glasses have softening temperatures (Ew) of 936°–969° C., processing temperatures ($V_A$) of 1232°–1273° C., densities of 2.638–2.767 g/cc, and $T_K 100$-values of about 600° C. From this difference of $V_A$-Ew results a processing technology length of greater than 300° C. for the glasses. This causes them to be better suited for machine tube manufacturing (e.g. Danner-traction) than similar familiar but usually shorter glasses for which $V_A$-Ew is less than 300° C.

Finally, it is advantageous for manufacturing that the glasses of the present invention have a lower devitrification tendency. The glasses of this invention exhibit only a weak surface devitrification in the temperature range of 1020°–1300° C. with the maximum between 1150°–1250° C. and crystalline growth speeds of 0.05–0.40 mm/min. determined in accordance with the gradient method with a temper period of 60 minutes described in Glastechn. Ber. 41(4): 138–145 (1968).

The range of compositions of the present invention permits the manufacture both of clear (i.e., colorless in a technical sense) glasses as well as glasses with a yellow coloring or tinting. These yellow glasses therefore permit the direct manufacture of yellow light halide lamps in an advantageous manner without the use of any additional filter glasses. Yellow tinting of the glasses of the invention is achieved by the simultaneous introduction $CeO_2$ in the form of the hydrate and of $TiO_2$, with the sum of $CeO_2 + TiO_2$ of 7.67–12.26 percent by weight and a ratio of $CeO_2:TiO_2$ of 1.56–2.29. The transmission values of these glasses in the visible range for a layer thickness of 0.5 mm lie between 60 and 85%. Yellow glasses of this type have not been known in the prior art.

The fusion stresses of glasses according to the invention towards molybdenum (strain double refraction, represented as optical path difference in nm/cm), range from weak tensile stresses (negative signs) to the range of compressive stress (positive sign), i.e. from −12 nm/cm to +300 mn/cm. These values assure a perfect mechanical strength of such a molybdenum glass compound during continuous or sustained use.

It is generally desirable to utilize the familiar effect of $ZrO_2$ which increases viscosity; however, $ZrO_2$ at the same time has been known for its extremely poor solubility. Surprisingly, it has been found that, by simultaneously introducing considerable quantities of CaO, the solubility of $ZrO_2$ is strongly improved in glasses of the system. The solubility promoting effect of CaO on $ZrO_2$ is therefore an essential feature of the glasses of the invention, which avoids the normally poor solubility of $ZrO_2$ while simultaneously using the strong viscosity promoting effect of $ZrO_2$ for increasing the Tg.

The glasses in accordance with this invention are characterized by the following ranges of composition, expressed in percent by weight:

| Range for Clear (Colorless) and Yellow Glasses: | |
|---|---|
| $SiO_2$ | 57.00–64.00 wt. % |
| $Al_2O_3$ | 12.50–16.50 wt. % |
| $ZrO_2$ | 1.00– 5.50 wt. % |
| $Al_2O_3 + ZrO_2$ | 15.00–19.00 wt. % |
| CaO | 11.50–19.20 wt. % |
| BaO | 0– 6.50 wt. % |

-continued

| Range for Clear (Colorless) and Yellow Glasses: | |
|---|---|
| $CeO_2$ | 0- 8.00 wt. % |
| $TiO_2$ | 0- 4.50 wt. % |
| $CaO + BaO + CeO_2 + TiO_2$ | 18.60-25.70 wt. % and |
| $As_2O_3$ | 0- 0.30 wt. % (introduced as purifying/refining agent). |

| Range for Clear Glasses: | | |
|---|---|---|
| $SiO_2$ | 59.00-64.00 wt. % | |
| $Al_2O_3$ | 12.50-16.50 wt. % | |
| $ZrO_2$ | 1.00-5.50 wt. % | |
| $Al_2O_3 + ZrO_2$ | 15.00-19.00 wt. % | |
| CaO | 15.50-19.20 wt. % | |
| BaO | 1.00-6.50 wt. % | |
| CaO + BaO | 18.60-22.70 wt. % | and |
| $As_2O_3$ | 0-0.30 wt. % | as above |
| $CeO_2$ | 0-0.20 wt. % | introduced as purifying/refining agents. |

| Yellow Glasses: | | |
|---|---|---|
| $SiO_2$ | 57.00-60.00 wt. % | |
| $Al_2O_3$ | 14.50-15.00 wt. % | |
| $ZrO_2$ | 2.00-2.80 wt. % | |
| $Al_2O_3 + ZrO_2$ | 16.50-17.80 wt. % | |
| CaO | 11.50-15.30 wt. % | |
| $CeO_2$ | 5.00-8.00 | |
| $TiO_2$ | 2.70-4.50 wt. % | |
| $CaO + CeO_2 + TiO_2$ | 23.00-25.70 wt. % | |
| $CeO_2 + TiO_2$ | 7.70-12.30 wt. % | and |
| $CeO_2:TiO_2$ | 1.56-2.29. | |

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLES 1–15

Tables 1 and 2 contain 15 examples of compositions in the range of compositions of the present invention, expressed in percent by weight, and the characteristic features of these glasses, which are prepared according to conventional techniques known for the preparation of $SiO_2$-$Al_2O_3$-alkaline earth oxide glass compositions. Chromaticity diagram information is shown for Examples 11–15 from which the value for z can be calculated (since $x + y + z = 1$); other values can similarly be readily ascertained.

TABLE 1

| Examples of Composition in Percent by Weight | | | | | |
|---|---|---|---|---|---|
| Components | 1 | 2 | 3 | 4 | 5 |
| $SiO_2$ | 61.00 | 59.00 | 61.00 | 62.50 | 62.00 |
| $Al_2O_3$ | 12.50 | 14.50 | 15.00 | 15.00 | 15.00 |
| $ZrO_2$ | 5.50 | 5.00 | 4.00 | 4.00 | 3.50 |
| CaO | 17.50 | 15.50 | 16.50 | 17.50 | 18.50 |
| BaO | 3.50 | 6.00 | 3.50 | 1.00 | 1.00 |
| $CeO_2$ | 0.15 | | 0.10 | 0.10 | 0.15 |
| $TiO_2$ | | | | | |
| $As_2O_3$ | | 0.30 | | | |
| Sum of Percent | 100.15 | 100.30 | 100.10 | 100.10 | 100.10 |
| Appearance | Clear | Clear | Clear | Clear | Clear |
| Components | 6 | 7 | 8 | 9 | 10 |
| $SiO_2$ | 62.30 | 64.00 | 60.00 | 62.00 | 61.50 |
| $Al_2O_3$ | 14.50 | 12.50 | 16.50 | 15.00 | 15.00 |
| $ZrO_2$ | 3.00 | 2.50 | 2.50 | 2.50 | 1.00 |
| CaO | 19.20 | 18.50 | 18.50 | 16.50 | 16.00 |
| BaO | 1.00 | 2.50 | 2.50 | 4.00 | 6.50 |
| $CeO_2$ | 0.15 | 0.20 | 0.20 | 0.20 | 0.20 |
| $TiO_2$ | | | | | |
| $As_2O_3$ | | | | | |
| Sum of Percent | 100.10 | 100.20 | 100.20 | 100.20 | 100.20 |
| Appearance | Clear | Clear | Clear | Clear | Clear |
| Components | 11 | 12 | 13 | 14 | 15 |
| $SiO_2$ | 60.00 | 58.00 | 58.00 | 60.00 | 57.00 |
| $Al_2O_3$ | 15.00 | 15.00 | 15.00 | 15.00 | 14.50 |
| $ZrO_2$ | 2.00 | 2.00 | 2.00 | 2.00 | 2.80 |
| CaO | 15.30 | 13.50 | 12.70 | 11.50 | 14.20 |
| BaO | | | | | |
| $CeO_2$ | 5.00 | 8.00 | 8.00 | 7.00 | 7.30 |
| $TiO_2$ | 2.70 | 3.50 | 4.30 | 4.50 | 4.20 |
| $As_2O_3$ | | | | | |
| Sum of Percent | 100.00 | 100.00 | 100.00 | 100.00 | 100.00 |
| Appearance | P. Yellow | D. Yellow | D. Yellow | D. Yellow | D. Yellow |

P. Yellow = Pale Yellow
D. Yellow = Dark Yellow

TABLE 2

| Characteristics Values of Glasses 1–15 of Table 1 | | | | | |
|---|---|---|---|---|---|
| Characteristics | 1 | 2 | 3 | 4 | 5 |
| $\alpha \times 10^6 (20-300° C.)/°C.$ | 5.05 | 4.99 | 4.84 | 4.73 | 4.96 |
| $Tg(°C.; \eta ca. 10^{13.5} P$ | 797 | 800 | 800 | 800 | 800 |
| $Ew(°C.); \eta = 10^{7.6} P$ | 940 | | 958 | | 969 |
| $V_A(°C.); \eta = 10^4$ Poise | 1255 | 1273 | 1262 | 1271 | 1270 |
| $V_A - Ew(°C.)$ | 315 | | 304 | | 301 |
| Density (g/cc) | 2.709 | | 2.679 | 2.638 | 2.65 |
| $T_{K100}(°C.); \xi = 10^8 \Omega.cm$ | 609 | | 599 | | |
| Fusion stress towards Molybdenum (nm/cm) | +92 | −12 | +52 | +170 | +110 |
| Color coordinates x, y and $\tau_{ges}$(%) x in accordance with y DIN 5033 for standard light C and 0.5 mm. $\tau_{ges}$ Thickness | | | | | |
| Characteristics | 6 | 7 | 8 | 9 | 10 |
| $\alpha \times 10^6 (20-300° C.)/°C.$ | 5.10 | 5.03 | 5.03 | 4.92 | 5.05 |
| $Tg(°C.; \eta ca. 10^{13.5} P$ | 795 | 783 | 794 | 810 | 788 |
| $Ew(°C.); \eta = 10^{7.6} P$ | 942 | 950 | 951 | | 966 |
| $V_A(°C.); \eta = 10^4$ Poise | 1242 | 1251 | 1255 | 1269 | 1268 |
| $V_A - Ew(°C.)$ | 300 | 301 | 304 | | 302 |
| Density (g/cc) | 2.652 | 2.638 | 2.665 | 2.661 | 2.67 |
| $T_{K100}(°C.); \xi = 10^8 \Omega.cm$ | | | | | |
| Fusion stress towards Molybdenum (nm/cm) | +11 | +90 | +59 | +25 | +162 |
| Color coordinates x, y and $\tau_{ges}$(%) x in accordance with y DIN 5033 for standard light C and 0.5 mm. $\tau_{ges}$ Thickness | | | | | |
| Characteristics | 11 | 12 | 13 | 14 | 15 |
| $\alpha \times 10^6 (20-300° C.)/°C.$ | 4.90 | 4.78 | 4.67 | 4.60 | 4.85 |
| $Tg(°C.) \eta ca. 10^{13.5} P$ | 782 | 775 | 775 | 775 | 777 |
| $Ew(°C.); \eta = 10^{7.6} P$ | | | | 936 | |
| $V_A(°C.); \eta = 10^4$ Poise | | 1233 | 1232 | 1236 | 1232 |
| $V_A - Ew(°C.)$ | | | | 300 | |
| Density (g/cc) | 2.712 | 2.758 | 2.756 | 2.731 | 2.767 |
| $T_{K100}(°C.); \epsilon = 10^8 \Omega.cm$ | | | | | |
| Fusion stress towards Molybdenum (nm/cm) | +92 | +225 | +300 | +260 | +215 |

TABLE 2-continued

Characteristics Values of Glasses 1-15 of Table 1

Color coordinates
x, y and $\tau_{ges}$(%) in accordance with DIN 5033 for standard light C and 0.5 mm. $\tau_{ges}$ Thickness

| | | | | |
|---|---|---|---|---|
| x | 0.3277 | 0.3581 | 0.3991 | 0.4165 |
| y | 0.3426 | 0.3797 | 0.4198 | 0.4343 |
| | 85 | 74 | 62 | 60 |

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

Industrial Applicability

As can be seen from the present specification and examples, the present invention is industrially useful in the manufacture of so-called halide lamps and/or halide-containing filament lamps with regenerating cycles which have a high thermal load capability.

What is claimed is:

1. $SiO_2$-$Al_2O_3$-alkaline earth oxide glass compositions suitable for glass/molybdenum sealings with high thermal load capability, having coefficients of thermal expansion in the temperature range of 20° to 300° C. of $4.6$-$5.1 \times 10^{-6}$/°C., glass transformation temperatures (Tg) of 775°-810° C., softening temperatures (Ew) greater than 930° C., processing temperatures ($V_A$) of 1232°-1273° C. and a length of $V_A$-Ew greater than 300° C. as regards processing technology of these glasses in the mixture, which consist essentially of the following components, computed as percent by weight oxides:

| | |
|---|---|
| $SiO_2$ | 57.00–64.00 wt % |
| $Al_2O_3$ | 12.50–16.50 wt % |
| $ZrO_2$ | 1.00–5.50 wt % |
| $Al_2O_3$ + $ZrO_2$ | 15.00–19.00 wt % |
| CaO | 11.50–19.20 wt % |
| BaO | 0–6.50 wt % |
| $CeO_2$ | 0–8.00 wt % |
| $TiO_2$ | 0–4.50 wt % |
| CaO + BaO + $CeO_2$ + $TiO_2$ | 18.60–25.70 wt % and |
| $As_2O_3$ | 0–0.30 wt % |

2. Colorless molybdenum sealing glasses according to claim 1 which contain:

| | |
|---|---|
| $SiO_2$ | 59.00–64.00 wt. % |
| $Al_2O_3$ | 12.50–16.50 wt. % |
| $ZrO_2$ | 1.00–5.50 wt. % |
| $Al_2O_3$ + $ZrO_2$ | 15.00–19.00 wt. % |
| CaO | 15.50–19.20 wt. % |
| BaO | 1.00–6.50 wt. % |
| CaO + BaO | 18.60–22.70 wt. % |
| $As_2O_3$ | 0–0.30 wt. % and |
| $CeO_2$ | 0–0.20 wt. % |

3. Yellow molybdenum sealing glasses according to claim 1 which contain:

| | |
|---|---|
| $SiO_2$ | 57.00–60.00 wt. % |
| $Al_2O_3$ | 14.50–15.00 wt. % |
| $ZrO_3$ | 2.00–2.80 wt. % |
| $Al_2O_3$ + $ZrO_2$ | 16.50–17.00 wt. % |
| CaO | 11.50–15.30 wt. % |
| $CeO_2$ | 5.00–8.00 wt. % |
| $TiO_2$ | 2.70–4.50 wt. % |
| CaO + $CeO_2$ + $TiO_2$ | 23.00–25.70 wt. % |
| $CeO_2$ + $TiO_2$ | 7.70–12.30 wt. % and |
| $CeO_2$:$TiO_2$ | 1.56–2.29 wt. %. |

* * * * *